Patented June 5, 1934

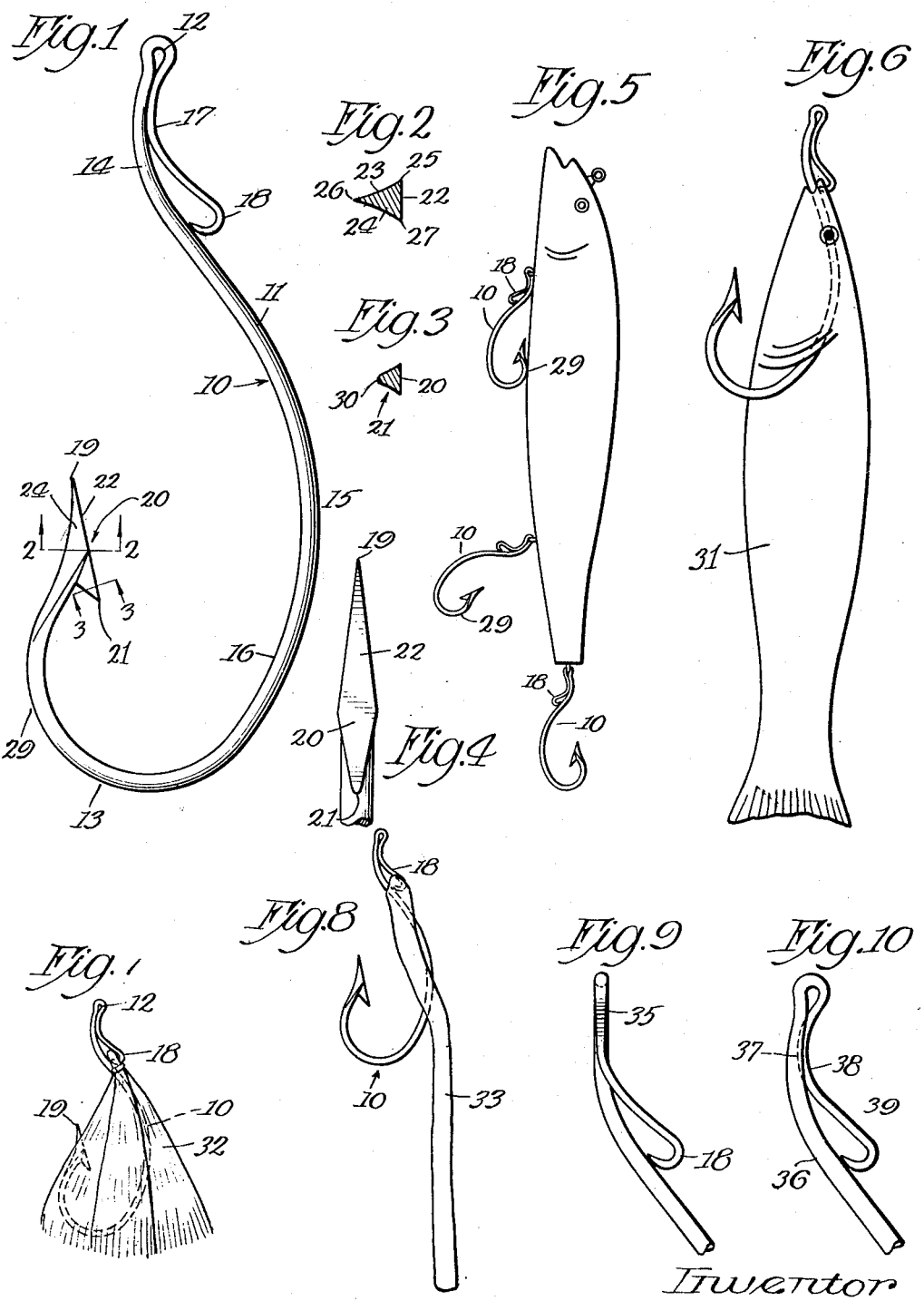

1,961,378

UNITED STATES PATENT OFFICE 1,961,378

FISHHOOK

Merlin Mitchell, Orlando, Fla.

Application March 21, 1932, Serial No. 600,157

4 Claims. (Cl. 43—40)

This invention relates to fishing tackle, and, more particularly, to fish hook construction.

One of the objects of the invention is the provision of a new and improved fish hook having the shank so constructed that it is more or less resilient and so formed that a wide bend is provided adjacent to the barb.

Another object of the invention is the provision of a new and improved fish hook having the parts so constructed that there is easy penetration and so arranged that after penetration the retention of the fish on the hook is insured.

A still further object of the invention is the provision of a new and improved fish hook having a novel, supplemental, auxiliary or bait receiving hook secured to the stem or shank thereof.

A further object of the invention is the provision of a novel fish hook which is inexpensive to manufacture, efficient in use, simple in construction and that is light, strong and durable.

Other and further objects and advantages will appear from the following description taken in connection with the accompanying drawing, in which—

Fig. 1 is a side elevation of a fish hook embodying the invention;

Fig. 2 is a section on the line 2—2 of Fig. 1;

Fig. 3 is a section on the line 3—3 of Fig. 1;

Fig. 4 is an elevation looking outwardly from the interior of the hook toward the barb and point thereof;

Fig. 5 is a side elevation of a hook showing the same attached to a lure;

Fig. 6 shows the side elevation of a hook with live bait thereon;

Fig. 7 is a similar view of a hook with a different type of lure;

Fig. 8 is a similar view of a hook showing a different type of bait attached thereto;

Fig. 9 shows a modified form of hook;

Fig. 10 shows a still further modified form of the eye and auxiliary hook.

Referring now to the drawing, the reference character 10 designates the hook generally which comprises a shank or body portion 11 having what, for convenience of description, will be termed its upper end provided with an attaching eye 12 and having its opposite or lower end constructed to form the hook portion 13.

Suitable means are provided for permitting a certain amount of "give" or resilient movement in the fishing tackle. In the form of construction selected to illustrate one embodiment of the invention the shank of the hook is so constructed as to afford the necessary resiliency for this purpose.

As shown, the shank is preferably made of spring steel and is provided with a plurality of bends 14 and 15 which may be curved in opposite directions and form what will be termed an S-curve, as clearly shown in Fig. 1 of the drawing. The bend 14 is adjacent to the eye 12 and the curve 15 merges into the hook portion 13. The lower portion of the curve 15 is arranged to form with the hook portion 13 a wide bend 16 which will give ample space between the shank at this point and free end of the hook as will presently appear.

The eye 12 is preferably though not necessarily formed by a return bend in the end portion 17 of the hook, the terminal of the end portion 17 being again return bent to form a hook portion or auxiliary hook 18. The end portion 17 is in contact with the shank of the hook to form a closed loop for constituting the eye 12. The free end of the auxiliary hook 18 is likewise adjacent to or in contact with the shank 11 whereby the shank 11 constitutes a keeper or guard for the hook.

By means of this construction, a closed eye is formed at 12 and one in which a line, spinner ring, or the like, may be inserted by passing the same between the auxiliary hook and the shank 11. The auxiliary hook may be sprung away from the shank sufficiently for that purpose.

The point of the auxiliary hook being bent inwardly and upwardly forms a guide for conducting the line, loop or ring beneath the hook 18 when desired to insert the same in the eye 12. When it is desired to insert a line or spinner ring, for instance, in the eye 12, the same is thrown over the lower curved end of the hook 18 and then pulled upwardly and toward the shank 14, thereby causing the same to slide upwardly along said shank into the eye 12 by spreading the end portion 17 outwardly.

The hook proper 13 is sharpened at its free end, as at 19, and from the point to just below the barb 21 the hook portion is triangular in cross section with the base 22 extending in a plane at a right angle to the plane of the hook. The sides 23, 24 may, if desired, be made concave, whereby the edges 27, 25 and 26 may be sharp, thus insuring easy penetration without tearing or enlarging the opening through which the hook enters. The edge 26 is shown as it gradually merges into the body of the hook below the barb, thereby forming what might be termed a reinforcing flange for the hook at this point where the ordinary hook is weakened by the formation of the barb therefrom.

The barb 21 is in alignment with the face 22 whereby the same will be so positioned as to facilitate penetration and offer the maximum obstruction to freeing the hook after penetration has been accomplished. The barb is also preferably, though not necessarily, substantially triangular in cross-section, with a more or less rounded vertex, as shown at 30 in Fig. 3. The barb and point, when viewed from the inside of the hook, is substantially diamond shape, as shown at 20 in Fig. 4.

The portion of the hook beneath the barb 21 is bowed or curved outwardly, as at 29, whereby the fish, after penetration, will be held in the deep bend 29 with the penetrated portion offset from the barb, thereby preventing the fish from "throwing" the hook.

When employed on wooden lure, as shown in Fig. 5, the bend 29 will prevent the point of the hook from coming in contact with and chipping the enamel of the lure.

If desired, the hook may be baited with a live minnow 31 by passing the hook through the mouth and out through the gills, as shown in Fig. 6. The nose or upper lip of the minnow is attached to the auxiliary hook. Because of the wide bend 15 in the shank the pointed end of the hook will remain free, as clearly shown in said Fig. 6.

In Fig. 7 is shown the manner of attaching a fly 32 of hair, wool, thread, feathers, or the like, to the hook. The fly is attached to the auxiliary hook 18 for holding the same in position. If desired, a portion of the fly may be clamped between the shank of the hook.

A meat rind 33, or the like, may be secured by threading the main hook through the same and by securing the end on the auxiliary hook 18, as shown in Fig. 8.

If desired, the eye of the hook may be arranged at a right angle to the plane of the hook, as shown at 35 in Fig. 9.

The form of construction shown in Fig. 10 differs from that disclosed in Fig. 1 in that the shank portion 36 is provided with a recess 37 in which is seated the bend 38 of the auxiliary hook member 39.

While the form of construction disclosed is the preferred form of my invention, it is understood that the disclosure is by way of example only and that various changes in sizes, proportions and forms of the various parts may be resorted to without departing from the spirit of the invention or sacrificing any of the advantages thereof.

What I claim, therefore, is:

1. As an article of manufacture, a fish hook comprising an S-shaped shank portion of spring metal, and a hook portion, said hook portion being pointed and said shank portion being return bent to form a short minnow bait supporting hook in close proximity to said shank portion for engaging the nose of a minnow bait for supporting the head of the same above the bend of said hook, said point being triangular in cross section with the apex portion outwardly.

2. As an article of manufacture, a fish hook comprising a resilient S-shaped shank portion terminating at its lower end in a hook portion, said hook portion being pointed and provided with a downwardly extending pointed barb, the upper end of said shank portion being return bent to form an eye and bent to provide a guide for directing an element between said end and said shank.

3. In a fish hook, a shank portion having its upper end return bent to form an eye, said shank portion having a recess therein, said end beyond said eye being curved inwardly to engage in said recess and having the terminal portion bent outwardly and curved inwardly to form an auxiliary hook with said shank portion forming a guard therefor.

4. A fish hook comprising an S-shaped shank merging into a hook portion having a point, the portion of the hook below said point and the portion of the shank opposite said point being curved in opposite directions, the upper end of said shank being return bent to form a minnow bait supporting hook, the space defined by said hook and shank being ample to permit said hook to engage the nose of a minnow bait but not large enough to permit the hook to engage the gill flap of said minnow bait, whereby the minnow bait will be supported entirely by its nose by said minnow bait supporting hook in spaced relation to said hook portion.

MERLIN MITCHELL.